United States Patent [19]

Wiseheart et al.

[11] 4,451,106
[45] May 29, 1984

[54] SNAP IN COMMUNICATIONS JACK AND COVER PLATE ASSEMBLY

[75] Inventors: Ronald W. Wiseheart, Hector; Daniel Meyer, Rochester, both of Minn.

[73] Assignee: Communication Systems, Inc., Hector, Minn.

[21] Appl. No.: 309,234

[22] Filed: Oct. 7, 1981

[51] Int. Cl.³ .............................................. H02B 1/02
[52] U.S. Cl. .................................. 339/123; 339/128; 339/206 R
[58] Field of Search .............. 339/17 C, 17 LC, 91 R, 339/119 R, 120, 121, 123, 125 R, 126 R, 126 RS, 128, 176 MP, 206 R, 206 P; 179/1 PC

[56] References Cited

U.S. PATENT DOCUMENTS

| | | | |
|---|---|---|---|
| 4,040,699 | 8/1977 | Rasmussen | 339/91 R |
| 4,193,654 | 3/1980 | Hughes et al. | 339/91 R |
| 4,261,633 | 4/1981 | Abernethy | 339/123 |
| 4,343,527 | 8/1982 | Harrington et al. | 339/125 R |

Primary Examiner—John McQuade
Assistant Examiner—David L. Pirlot
Attorney, Agent, or Firm—Kinney & Lange

[57] ABSTRACT

A communication cover plate and jack assembly includes a cover plate and a jack body removably attached to the cover plate. The cover plate has a pair of parallel resilient wall portions extending outwardly therefrom with each cover plate wall portion having an integral lug. The jack body has a pair of parallel jack body sidewall portions each having integral ridges extending outwardly therefrom. The sidewall portions of the jack body fit between the wall portions of the cover plate with the lugs and the ridges being in interfering relationship with each other securely holding the jack body and the cover plate together.

2 Claims, 8 Drawing Figures

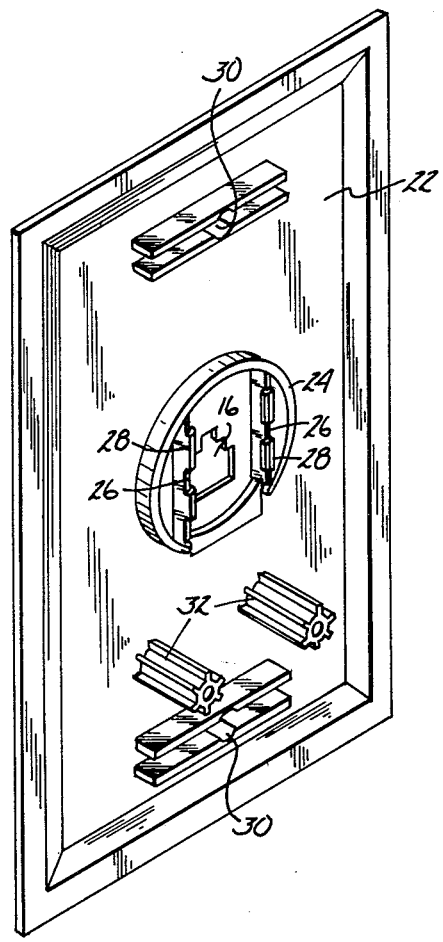
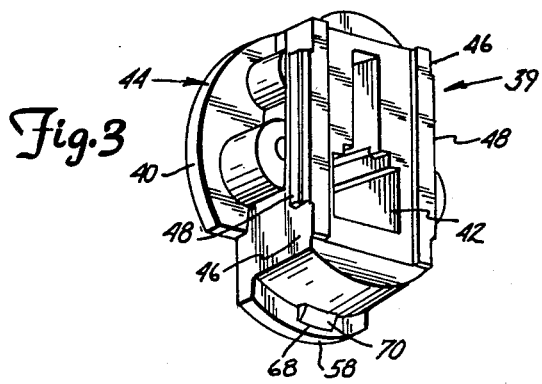
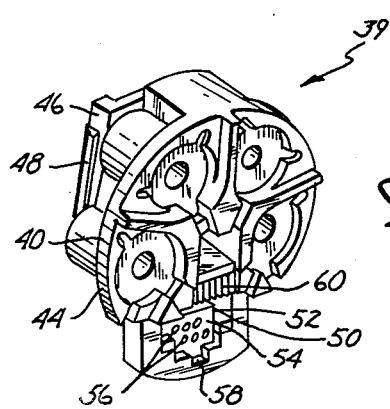

SNAP IN COMMUNICATIONS JACK AND COVER PLATE ASSEMBLY

BACKGROUND OF THE INVENTION

1. Field of the Invention

This invention relates to communication jacks and cover plate assemblies which snap together and do not need to be otherwise bonded.

2. Description of Prior Art

In the prior art, communication jacks are attached to cover plates by various bonding means. A common method is to hold the plastic jack body against the plastic cover plate and bond the two parts with a sonic weld. This is a technically complex and expensive method for attaching the jack body to the plate. Such a weld cannot be separated and reconnected. Field changes in parts are not possible.

SUMMARY OF THE INVENTION

A cover plate is provided with a jack opening therethrough. A wall extends away from the back surface of the cover plate, circumscribing the jack opening. The wall has at least two straight parallel spaced-apart cover plate wall portions, at least a first of which is resilient. A jack body, formed of nonconductive material, is provided with a communications jack opening. The jack body is defined by a peripheral surface of a shape to mate with the wall in order to position the communications jack in precise alignment with the jack opening in the cover plate. The jack body has a first jack body wall portion for alignment next to the first cover plate wall portion and a second jack body wall portion for alignment next to the second cover plate wall portion. One of the first wall portions has a lug and the other first wall portion has a ridge. The lug and the ridge lie in interfering relationship with each other. When the jack body jack opening is aligned with the jack opening in cover plate wall, and forced toward the back surface of the cover plate, the lug and ridge flex the resilient first wall portion of the cover plate way to allow the lug and ridge to pass each other. Once they pass each other the resilient wall returns so that the lug and ridge lock the jack body with respect to the cover plate. As shown, similar means is provided on the second wall portions for locking the second cover plate wall portion with respect to the second jack body wall portion.

A spring block carries communication wires and is of configuration to be inserted into a spring block receptacle provided in the jack body. Resilient spring contact wires are mounted in the spring block and are electrically conductively connected to the communication wires. As shown, these spring contact wires have a normal position extending in the straight line from the front of the spring block upward and backward at an acute angle to the spring block. The spring block receptacle has a plurality of teeth extending downward from the top inner surface of the receptacle for keeping the spring contact wires separated when the spring block is inserted. A flange extends downward from the spring block parallel to the front surface of the spring block. In the embodiment shown, the flange has a bevel facing the front of the spring block. A ramp bar on the bottom inner surface of the spring block receptacle is parallel to the front of the flange and lies in an interfering relationship with the flange when the spring block is positioned against the spring block receptacle. When the spring block is inserted in the spring block receptacle, the spring block is moved upward so that the flange passes the ramp bar. In the example shown, the bevel of the flange strikes the ramp bar, forcing the spring block upward as it enters the spring block receptacle. This compresses the spring contact wires toward the spring block. When the flange passes the ramp bar, the resilient spring contact wires return to their normal position and the ramp bar engages the flange, locking the spring block in the spring block receptacle. At this point, each of the spring contact wires lies between a pair of teeth in the spring block receptacle. These spring contact wires form the electrical contact for any communication plug inserted in the communications jack.

BRIEF DESCRIPTION OF THE DRAWINGS

FIG. 2 is a perspective view of the back of the cover plate of FIG. 1;

FIG. 3 is a perspective view of the front of a communications jack body useful with the cover plate of FIGS. 1 and 2;

FIG. 4 is a perspective view of the rear of the jack body of FIG. 3;

DETAILED DESCRIPTION OF THE PREFERRED EMBODIMENTS

Figures 1, 5:
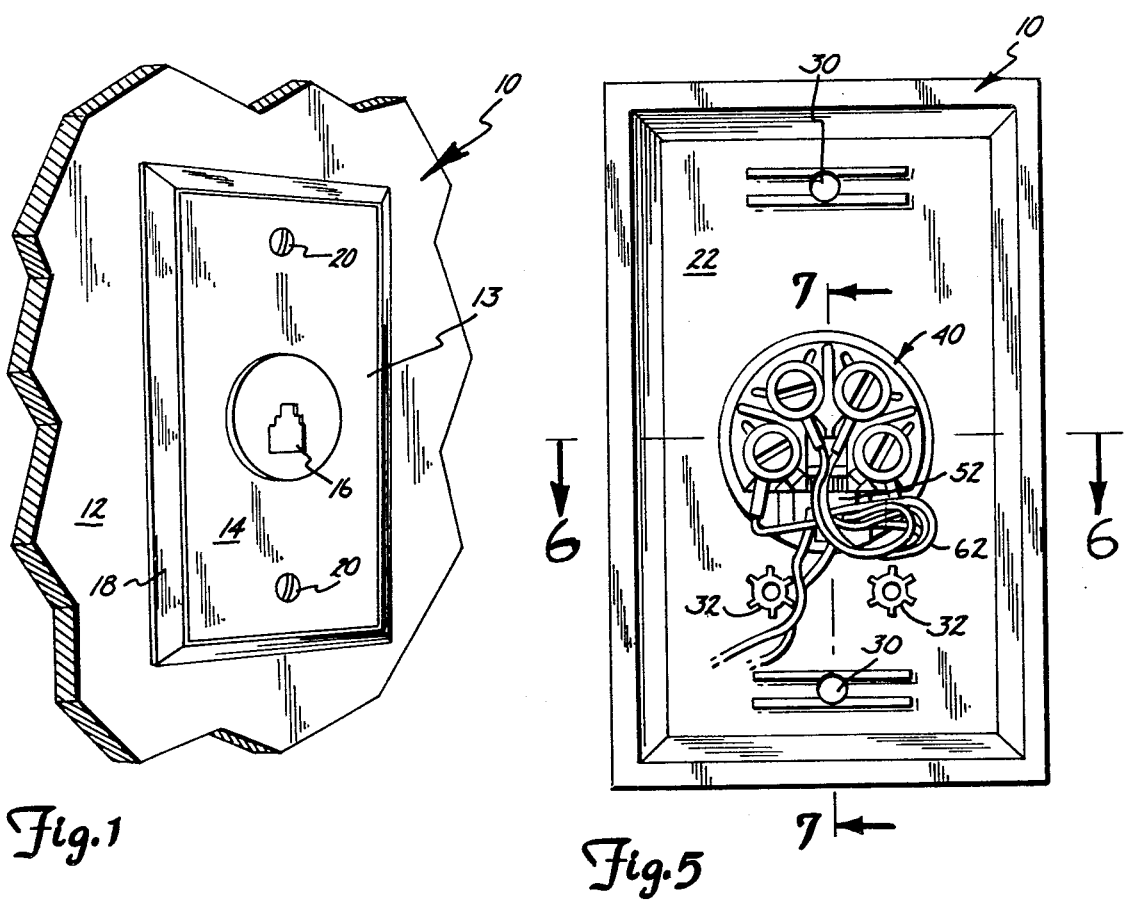
FIG. 1 is a perspective view of the front of a cover plate of the invention mounted on a fragment of wall.
FIG. 5 is an elevational view of the back of the communications jack body and cover plate of FIGS. 1 through 4 after they have been assembled to each other.

A cover plate 10 is shown in FIG. 1 mounted on a portion of an interior building wall 12. The cover plate includes a plate member 13 which has a front face 14, through which is provided a jack opening 16; and beveled sides 18 around the edges of the plate member. The plate 10 is held to wall 12 by two screws 20,20. Extending perpendicularly from a back surface 22 of plate member 13 is a wall member 24, as shown in FIG. 2. Wall member 24 includes two parallel, straight resilient wall portions 26,26 which are situated on either side of a cover plate jack opening 16, provided through plate member 13. Each wall portion 26 has a lug or protrusion 28 which extends generally perpendicularly from the outer end of its wall portion toward jack opening 16. Extending through plate member 13 are two screw apertures 30,30 for the insertion of screws 20. Two terminal mountings 32,32 are provided on the plate member 13 for attaching electrical wires.

A communications jack 39 is shown in FIGS. 3 and 4. It includes a jack body 40 and a spring block 52. The front view of FIG. 3 shows a jack body jack opening 42 which is provided in jack body 40. Jack opening 42 accepts a communications plug (not shown but of the type now universally used in the telephone industry). A peripheral surface 44 of jack body 40 is shaped to mate within wall member 24 of the back surface 22 of plate member 13. When jack body 40 is mounted to cover plate 10 jack body, jack opening 42 is aligned exactly with jack opening 16. This allows insertion of a communications plug through cover plate member 13 into jack body jack opening 42.

Jack body 40 has two parallel side wall portions 46,46 which align with wall portions 26,26 of cover plate member 13. Extending generally perpendicularly outwardly from each jack body side wall portion 46 in direction away from jack openings 16 and 42 is a ridge 48. These ridges 48,48 lie in interfering relationship with lugs 28,28 when jack body 40 is positioned within wall 24.

Jack body 40 is shown in its mounted and locked in position on the back surface 22 of plate member 13 in FIG. 5. The details of the attachments are shown in the cross sectional view of FIG. 6. In the process of assembly, when jack body 40 is aligned with cover plate wall member 24 and wall portions 26,26, the ridges 48 and lugs 28 come in contact with each other. As jack body 40 is pressed toward the back surface 22, the contact between ridges 48 with lugs 28 flexes resilient cover plate wall portions 26 outward. When ridges 48 pass lugs 28, wall portions 26 snap backward so that jack body 40 is firmly held and trapped against back surface 22 by the contact of ridges 48 with lugs 28.

This solid attachment requires no glue, weld or other permanent bonding to hold the parts together. The attachment can be accomplished without special equipment. Unlike prior art bonding means, the two parts can be removed to make changes. To do this, resilient cover plate wall portions 26 are pried outward, jack body 40 can be removed from cover plate member 13.

The wiring of jack body 40 is also accomplished by a snap in mechanism which requires no bonding. As shown in FIG. 4, the jack body 40 is provided with a spring block receptacle 50 into which is inserted the spring block 52. A back side 54 of spring block 52 is provided with a plurality of communication wire ports 56.

Spring block receptacle 50 is partially defined by a ramp bar 58 at a bottom rearward portion and by a plurality of parallel, vertical, spaced-apart contact wire receiving teeth 60 on an upper rearward portion thereof. Ramp bar 58 is spaced from the remainder of the jack body to provide a spring block flange receiving opening 72.

Figures 6, 7:
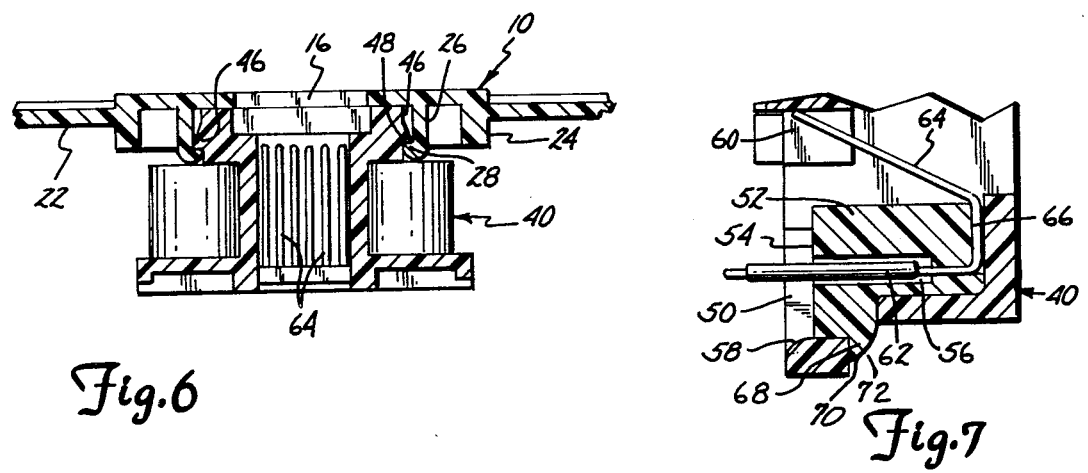
FIG. 6 is an enlarged horizontal cross sectional view of the communications jack body and cover plate assembly taken along the line 6—6 of FIG. 5.
FIG. 7 is a further enlarged vertical fragmentary cross sectional view taken along line 7—7 of FIG. 5, showing a portion of the jack body and a spring block which forms a part of the jack body and cover plate assembly of FIGS. 5 and 6.

Detail of the insertion of spring block 52 into spring block receptacle 50 is shown in FIG. 7. One of several communication wire 62 is shown mounted in one of the communication wire ports 56. Electrically conductively connected to each of the communication wires 62 are spring contact wires 64. From a front portion 66 of spring block 52, spring contact wires 64 extends backward and upward at an acute angle.

At the bottom of spring block 52 is a flange 68 with a forward facing bevel edge 70. In assembly, when spring block 52 is aligned with the spring block receptacle 50, spring block flange bevel edge 70 meets ramp bar 58. Spring contact wires 64 are separated by and pass between teeth 60. As spring block 52 is pushed into spring block receptacle 50, the interference of bevel edge 70 with ramp 58 raises spring block 52 upward, which compresses spring contact wires 64 down towards the spring block. When flange 68 enters opening 72 in the jack body and passes ramp bar 58, the spring block 52 snaps downward under the urging of spring contact wires 64. Spring block 52 is then held and locked securely in jack body 40 by the engagement of flange 68 with ramp bar 58. The position of flange 68 when spring block 52 is mounted in spring block receptacle 50 is perhaps best shown in FIG. 3.

Figure 8:
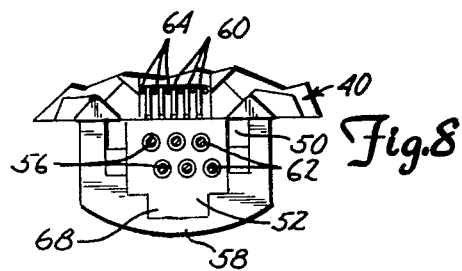
FIG. 8 is an enlarged fragmentary rear view of the back of a spring block mounted in the jack body.

A rear view of the spring block 52 mounted in spring block receptacle 50 is shown in FIG. 8 with communication wires omitted for clarity of illustration. The connection of communication wires 62 is indicated in FIG. 5. Communication wires 62 are mounted in spring block 52 and extend to four screw-type terminals 74 mounted on jack body 40. These terminals 74 allow attachment of wires from a telephone trunk line, for example, to electrically connect with communication wires 62.

Should replacement or repair of spring block 52 be necessary in the field or elsewhere at any time, the spring block can be removed from the jack body. This can be accomplished by forcing the spring block 52 up against the resilience of spring contact wires 64 until flange 68 clears ramp bar 58. Then by pulling gently on communication wires 62, the spring block can be extracted. It can then be replaced or repaired.

This invention allows assembly of the entire communications jack and cover plate assembly without the use of tools. The wiring is carried by a spring block which first snaps into the receptacle in a jack body. The jack body is then snapped manually onto the back of cover plate, completing the assembly. No expensive welding or other bonding equipment is necessary. The attachment is strong enough to be considered permanent. In the event a change is needed, however, one or both of the resilient walls can be pried out to allow removal of the jack body. Similarly, the spring block can be pressed upward compressing the spring contact wires so that the spring block can be removed from the jack body. This will allow field changes in the assembly.

In accordance with the present invention, various numbers of jack bodies can be provided in a single cover plate. Similarly, the number of communications wires and spring contact wires can be varied to accommodate a variety of communications plug designs.

Although the present invention has been described with reference to preferred embodiments, workers skilled in the art will recognize that changes may be made in form and detail without departing from the spirit and scope of the invention.

What is claimed is:

1. A communication jack body and cover plate assembly comprising:
   a cover plate having a plate member provided with a front face and a back surface, said plate member being provided with a cover plate jack opening therethrough;
   a plate wall member extending outwardly from said plate member circumscribing the jack opening and having two straight parallel longitudinally configured resilient spaced-apart cover plate wall portions integral with and extending away from the back surface of the cover plate and oriented longitudinally along the plate member;
   a jack body providing a jack body communications jack opening;
   the jack body being partially defined by a peripheral surface of a shape to mate with said plate wall member to position the communications jack opening in precise alignment with the cover plate jack opening;
   the jack body having first and second jack body wall portions of a longitudinal configuration to fit snugly between and adjacent to said spaced-apart first cover plate wall portions of said plate wall member, respectively;

both of said first cover plate wall portions being each provided with a lug and the jack body wall portions being each provided with a ridge, so that the lugs and the ridges lie in an interfering relationship with each other, the configuration of said cover plate wall portions, said lug, and said ridge being such that when the jack body is forced toward the back surface of the plate member, the lug and ridge cause the resilient cover plate wall portions to be deflected away to allow the lug and ridge to pass each other, thereby locking the jack body with respect to the cover plate when the resilient wall portions return to a nondeflected position and the longitudinal orientation of the cover plate wall portions providing a holding force along the length of the cover plate and jack body wall portions;

the jack body being provided with a spring block receptacle having a bottom interior surface and top interior surface;

a spring block shaped to be inserted in the spring block receptacle, and having a front end portion for insertion in the receptacle and a back end portion for supporting communication wires;

communication wires attached with respect to said spring block back end portion;

resilient spring contact wires mounted in said spring block electrically and conductively connected to the communication wires and having a normal position extending from the front portion of the spring block upward and backward at an acute angle to the spring block; the spring block receptacle being provided with a plurality of teeth in insulating material extending downward from the top interior surface of the receptacle, for maintaining separation between the spring contact wires;

a flange integral with and extending downward from the spring block opposite the spring contact wires and parallel to the front portion of the spring block, said flange having a bevel facing the front of the spring block; and a ramp bar at the bottom interior surface of the spring block receptacle parallel to the front portion of the spring block and lying in interfering relationship with the flange as the spring block is moved into the spring block receptacle, so that when the spring block is inserted in the spring block receptacle, the bevel of the flange strikes the ramp bar forcing the spring block upward as it enters the spring block receptacle, compressing spring contact wires toward the spring block until the flange passes the ramp, at which time the resilient spring wire contacts return to their normal position and the ramp engages the flange, locking the spring block in the spring block receptacle.

2. A communication jack and cover plate assembly comprising:

a cover plate having a face, a back surface, and the cover plate being provided with a cover plate jack opening therethrough;

a cover plate wall circumscribing the jack opening having two longitudinally configured resilient straight parallel spaced-apart cover plate wall portions, integral with and extending away from the back surface of the cover plate and oriented longitudinally along the back surface of the cover plate;

a jack body, formed of nonconductive material, provided with a communications jack opening;

the jack body being partially defined by a peripheral surface of a shape to mate with the cover plate wall to position the communications jack opening in precise alignment with the cover plate jack opening;

the jack body having first and second longitudinally configured jack body wall portions positioned for snug adjacent alignment with the spaced-apart cover plate wall portions and when said jack openings are aligned with each other; and said cover plate wall portions each being provided with a lug and the jack body wall portions being each provided with a ridge, so that the lugs and the ridges lie in an interfering relationship with each other, the configuration of said cover plate wall portions, jack body wall portions, lugs, and ridges being such that when the jack body is forced toward the back surface of the cover plate, the lugs and the ridges force the resilient wall portions away from each other to allow the lugs and ridges to pass each other, thereby locking the jack body with respect to the cover plate when the cover plate resilient wall portions return and the longitudinal orientation of the cover plate wall portions providing a holding force along the length of the cover plate and jack body wall portions.

* * * * *

Dedication 4,451,106.—*Ronald W. Wiseheart*, Hector and *Daniel Meyer*, Rochester, Minn. SNAP IN COMMUNICATIONS JACK AND COVER PLATE ASSEMBLY. Patent dated May 29, 1984. Dedication filed Sept. 27, 1984, by the assignee, *Communications Systems, Inc.*

Hereby dedicates to the Public the entire term of said patent.

[*Official Gazette December 11, 1984.*]